(12) United States Patent
Chidlovskii et al.

(10) Patent No.: US 7,953,679 B2
(45) Date of Patent: May 31, 2011

(54) SCALABLE INDEXING FOR LAYOUT BASED DOCUMENT RETRIEVAL AND RANKING

(75) Inventors: Boris Chidlovskii, Meylan (FR); Loïc M. Lecerf, Biviers (FR)

(73) Assignee: Xerox Corporation, Norwalk, CT (US)

( * ) Notice: Subject to any disclaimer, the term of this patent is extended or adjusted under 35 U.S.C. 154(b) by 90 days.

(21) Appl. No.: 12/556,098

(22) Filed: Sep. 9, 2009

(65) Prior Publication Data

US 2011/0022599 A1    Jan. 27, 2011

Related U.S. Application Data

(60) Provisional application No. 61/227,494, filed on Jul. 22, 2009.

(51) Int. Cl.
G06F 15/18      (2006.01)
G06E 1/00       (2006.01)
G06E 3/00       (2006.01)
G06G 7/00       (2006.01)

(52) U.S. Cl. ......................................................... 706/18
(58) Field of Classification Search ...................... 706/18
See application file for complete search history.

(56) References Cited

U.S. PATENT DOCUMENTS

| | | | |
|---|---|---|---|
| 7,099,861 B2 | 8/2006 | Houn | |
| 7,475,061 B2 | 1/2009 | Bargeron | |
| 7,698,255 B2 * | 4/2010 | Goodwin et al. | 707/707 |
| 7,698,303 B2 * | 4/2010 | Goodwin et al. | 707/603 |
| 7,707,157 B1 * | 4/2010 | Shen | 707/999.102 |
| 7,711,668 B2 * | 5/2010 | Brinker et al. | 706/45 |
| 7,734,627 B1 * | 6/2010 | Tong | 707/737 |
| 7,747,593 B2 * | 6/2010 | Patterson et al. | 707/705 |
| 7,805,389 B2 * | 9/2010 | Saito et al. | 706/45 |
| 7,809,718 B2 * | 10/2010 | Brinker et al. | 707/722 |
| 7,836,108 B1 * | 11/2010 | Kupke et al. | 707/826 |
| 7,836,406 B1 * | 11/2010 | Kirsten et al. | 715/777 |
| 7,844,566 B2 * | 11/2010 | Wnek | 706/55 |
| 7,856,411 B2 * | 12/2010 | Darr | 706/45 |

OTHER PUBLICATIONS

Efficient phrase-based document indexing for Web document clustering, Hammouda, K.M.; Kamel, M.S.; Knowledge and Data Engineering, IEEE Transactions on vol. 16 , Issue: 10 Digital Object Identifier: 10.1109/TKDE.2004.58 Publication Year: 2004 , pp. 1279-1296.*

ModelMaker: a tool for rapid modeling from device descriptions, Cyre, W.R.; Gunawan, A.; Verilog HDL Conference and VHDL International Users Forum, 1998. IVC/VIUF. Proceedings., 1998 International Digital Object Identifier: 10.1109/IVC.1998.660692 Publication Year: 1998 , pp. 138-142.*

(Continued)

*Primary Examiner* — Michael Holmes
(74) *Attorney, Agent, or Firm* — Fay Sharpe LLP

(57) ABSTRACT

A computer-based method and a system for indexing, querying, and ranking documents based on layout are provided. The method includes providing a plurality of documents to computer memory, extracting layout blocks from the provided documents, clustering the layout blocks into a plurality of layout block clusters, computing a representative block for each of the layout block clusters, generating a document index for each provided document based on the layout blocks of the document and the computed representatives blocks, clustering the created document indexes into a plurality of document index clusters, and generating a representative cluster index for each of the document index clusters. The indexes generated, together with the representative blocks and document index clusters, can be stored and used for retrieval of documents responsive to a layout query.

25 Claims, 11 Drawing Sheets

OTHER PUBLICATIONS

Phrase-based document similarity based on an index graph model, Hammouda, K.M.; Kamel, M.S.; Data Mining, 2002. ICDM 2002. Proceedings. 2002 IEEE International Conference on Digital Object Identifier: 10.1109/ICDM.2002.1183904 Publication Year: 2002, pp. 203-210.*

Web Document Clustering Using Document Index Graph, Momin, B.F.; Kulkarni, P.J.; Chaudhari, A.; Advanced Computing and Communications, 2006. ADCOM 2006. International Conference on Digital Object Identifier: 10.1109/ADCOM.2006.4289851 Publication Year: 2006, pp. 32-37.*

Chidlovskii, et al., Stacked Dependency Networks for Layout Document Structuring, *Journal of Universal Computer Science*, vol. 14, No. 18, pp. 2998-3010 (2008).

Datta, et al., Image Retrieval: Ideas, Influences, and Trends of the New Age, *ACM Comput. Surv.*, 40(2):1-60, 2008.

Janssen, et al., Uplib: A Universal Personal Digital Library System, In *DocEng '03: Proc. of the 2003 ACM Symposium on Document Engineering*, pp. 234-242, New York, NY, USA, 2003. ACM.

Nakai, et al., Camera-Based Document Image Retrieval as Voting for Partial Signatures of Projective Invariants, In *ICDAR '05: Proc. of the $8^{th}$ Intl. Conf. on Document Analysis and Recognition*, pp. 379-383, Washington, DC, USA, 2005. IEEE Computer Society.

Ramos, Using TF-IDF to Determine Word Relevance in Document Queries, *Department of Computer Science*, Rutgers University, 2003.

TF-IDF, Wikipedia, available at http://en.wikipedia.org/wiki/Tf-idf, downloaded May 22, 2009.

Van Beusekom, et al., Distance Measures for Layout-Based Document Image Retrieval, In *DIAL '06: Proc. of the $2^{nd}$ Intl. Conf. on Document Image Analysis for Libraries*, pp. 232-242, Washington, DC, USA, 2006. IEEE Computer Society.

Vilkner, et al., Micro Total Analysis Systems, Recent Developments, *Anal. Chem.*, 76, 3373-3386 (2004).

* cited by examiner

SCALABLE INDEXING FOR LAYOUT BASED DOCUMENT RETRIEVAL AND RANKING

This application claims the priority of U.S. Provisional Application Ser. No. 61/227,494, filed Jul. 22, 2009, the disclosure of which is incorporated herein in its entirety by reference.

BACKGROUND

The exemplary embodiment relates to indexing and querying documents. It finds particular application to querying medium to large sized databases of documents based on document layout, and will be described with particular reference thereto.

Much information is now available in electronic format and stored in personal, intranet and internet document collections. Over the last twenty years, significant progress has been achieved in the area of full text indexing and retrieval. Current techniques of information retrieval allow a user to query document collections with one or multiple keywords and retrieve and rank the relevant documents. In the case of documents available on the World Wide Web (Web), search engines such as Google, Yahoo and MSN crawl the Web and index Web pages as well as PDF and Word documents. For all document types, the search engines use text and link information contained within the documents in order to retrieve relevant documents and rank them. However, layout information contained within the document is ignored.

Nevertheless, querying document collections by document layout would be extremely useful when a user possesses visual, as opposed to textual, information, or when a query is difficult or even impossible to express with keywords. This is particularly true in the office environment, where documents often have a generic structure, such as financial bills, forms, templates, catalogs, CVs, letters, etc. It would be advantageous for office personnel to find documents with a layout similar to a given document. Unfortunately, none of the current document query systems is capable of addressing such a need.

Example-based querying is widely used in the context of content-based image retrieval. However, because images are inherently complex, the understanding and semantic indexing of images is limited to specialized query types such as exact image matching, logo recognition and more categorization-like tasks, such as recognizing sky, flower or bike images. Querying by document layout can be considered a form of example-based querying. However, accurate relevance ranking of images by their (semantic) similarity is still far beyond the capabilities of current systems.

Existing methods of querying document collections by layout require intense processing for each (document, query) pair, including a 2-dimensional alignment between a query and each document in the collection. This alignment algorithm is time consuming and thus makes alignment based techniques limited to small and medium size collections. In a very large collection, the user is often interested in retrieving the top k relevant documents, thus the exhaustive document-to-query alignment becomes unnecessary and time wasting.

The present exemplary embodiment provides a system and method for indexing and querying documents by layout that avoids comparing the query document to all indexed documents through the use of clustering.

BRIEF DESCRIPTION

In one aspect, a computer-implemented method for creating a set of indexes for a collection of documents according to document layout is provided. The method includes providing a plurality of documents to computer memory, extracting layout blocks from the provided documents, using a computer processor, clustering the layout blocks into a plurality of layout block clusters, computing a representative block for each of the layout block clusters, generating a document index for each provided document based on the layout blocks of the document and the computed representatives blocks, clustering the created document indexes into a plurality of document index clusters, generating a representative cluster index for each of the document index clusters, and outputting the created document indexes, representative blocks, document index clusters, and representative cluster indexes to a memory.

In another aspect, a computer-implemented method for querying a collection of documents according to document layout is provided. The method includes providing in computer memory a set of representative blocks, each representative block being representative of a respective cluster of layout blocks extracted from documents in the collection, a set of document indexes, each document index being representative of layout blocks of a respective document in the collection, each of the document indexes being assigned to a respective one of a set of document index clusters, and a representative document index for each document index cluster, each representative document index being derived from the document indexes assigned to the document index cluster; extracting layout blocks from an input document layout query; projecting the extracted layout blocks from the document layout query onto the set of representative blocks to generate a query document index; with a computer processor, computing a measure of similarity between the query document index and each of the representative document indexes in the set of representative document indexes; identifying a top document index cluster which includes the representative document index determined to have the greatest similarity to the query document index; computing a measure of similarity between each document index in the top document index cluster and the query index to identify a set of most similar documents; and outputting information on the documents in the set of most similar documents.

In another aspect, a computer-based system for querying a collection of documents according to a document layout is provided. The system includes a data input module configured to receive into memory a set of document indexes, a set of representative blocks, a set of document index clusters, a set of representative indexes, and a document layout query; a document query module configured to extract layout blocks from the document layout query, project the extracted layout blocks from the document layout query onto the set of representative blocks to generate a query index, compute the similarity between the query index and each of the representative indexes in the set of document index clusters by using a ranking function, identify the document index cluster containing the representative index having the greatest similarity as the top document index cluster, and compute the similarity between each document index in the top document index cluster and the query index by using the ranking function; and a document ranking module configured to maintain an ordered list of the top k documents based on the computed similarity between each document index in the top document index cluster and the query index, and output the ordered list.

DETAILED DESCRIPTION

Figure 1:
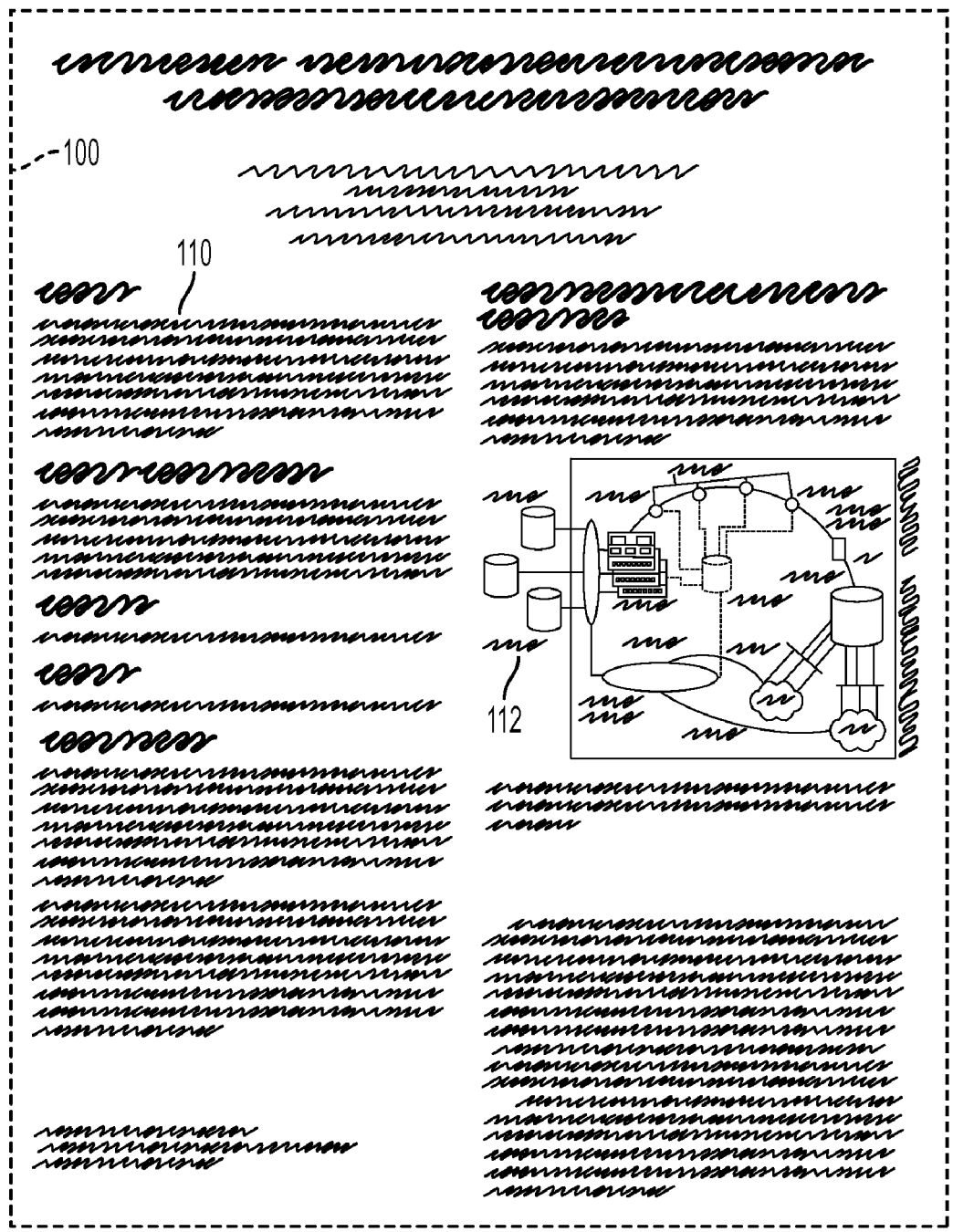
FIG. 1 is an example of a page of an input electronic document that is part of a document collection to be indexed.

Aspects of the present exemplary embodiment relate to a system and method for indexing and querying documents according to a document layout. Through the use of clustering and the concept of "representative blocks," the method can avoid comparing the query document to all indexed documents.

As used herein, a "document" can be an electronic document in any suitable form, such as PDF, TIFF, BMP, or Microsoft Office document and may include images, text, or combinations thereof. Images can be photographs, graphics, etc.

As explained in further detail below, the exemplary method of indexing a collection of documents based on the layout of each document may include the following:

First, the layout for each document in a collection is extracted from the document. A layout is defined by the arrangement of text and pictures in a given document. Conceptually, a layout can be thought of as one or more "blocks" arranged on a document, with each block containing contiguous text and/or pictures. Each block has an area which may be the minimum required to completely bound the text or image contained in the block. Thus, the first step comprises extracting all the "blocks" from each document in a collection, with each block comprising location information sufficient to define the block's size and page location, such as a set of two points to represent the upper left and bottom right corners. The layout extraction aims to assign all the visually displayed information in a document to a respective block. In general, each page will include at least two and generally at least three blocks. The number of blocks can be up to about 50 per page.

Next, the entire group of extracted layout blocks is grouped into a pre-defined number of clusters according to a clustering algorithm based on the location information. The pre-defined number may vary depending on various factors, such as the size of the document collection and the desired results. Exemplary clustering algorithms, such as k-means and/or a hierarchical clustering algorithm, may be used as a suitable method for clustering data. In an approach using a hierarchical clustering algorithm, a hierarchy of clusters is constructed. See http://en.wikipedia.org/wiki/Hierarchical_clustering. In the k-means approach, a number m of clusters is selected. m may be, for example, from about 10 to 30. However, any other current or future clustering algorithm may be used.

Each layout block cluster will contain a plurality of blocks extracted from different documents. In order to promote speed and efficiency, a "representative block" is computed for each cluster that mathematically represents every layout block in the cluster. Each layout block cluster will have exactly one representative block.

A document index $D^R$ is then generated for each document in the collection with respect to the collection of representative blocks. The document index is generated by projecting or measuring, among other things, the distance or similarity between each block in the document and each of the representative blocks, with identical blocks having a distance of 0. Any suitable measure for the distance between two blocks may be considered. The block of interest may be represented by $b_1=(p_{11},p_{12})$ and the representative block by $b_2=(p_{21},p_{22})$, where $p_{11}$ is the first point (i.e., the upper left point) of the first block, $p_{21}$ is the first point of the second block, $p_{12}$ is the second point (i.e., the bottom right point) of the first block, and $p_{22}$ is the second point of the second block.

One exemplary distance measure is the Manhattan distance, which can be defined as follows:

$$D_m(b_1,b_2)=d_m(p_{11},p_{21})+d_m(p_{12},p_{22}) \quad \text{Eqn (1)}$$

where $d_m(p_1,p_2)=|x_1-x_2|+|y_1-y_2|$ is the Manhattan distance between two points $p_1$ and $p_2$, with each point $p_i$ defined by two coordinates $(x_i, y_i)$.

Another suitable distance measure is the overlapping distance between two blocks given by their area of overlap:

$$d_o(b_1, b_2) = 1 - \frac{2 \times area(b_1 \wedge b_2)}{area(b_1)+area(b_2)} \quad \text{Eqn (2)}$$

where operation $(b_1 \wedge b_2)$ gives an overlap of two blocks $b_1$ and $b_2$ and $area(p_1,p_2)=|x_1-x_2|\times|y_1-y_2|$.

Another suitable distance measure takes the block positions and extends them with other attributes, like shape, type, etc., by building a tuple containing a sequence of location information and at least one attribute element. For example, when ov, ra, and tp are all considered, the tuple t representing a block may be in the form:

$$t=(x_1{}'',y_1{}'',x_2{}'',y_2{}'',ov,ra,tp) \quad (3)$$

where: $x_1{}'',y_1{}'',x_2{}'',y_2{}''$ are normalized $x_1,y_1,x_2,y_2$ values, e.g., normalized to the [0,1] range;

ra is the shape ratio, given by $$\frac{|x_1-x_2|}{|y_1-y_2|},$$

normalized in such a way that a square shape is 0.5 while vertical and horizontal blocks tend to 0 and 1, respectively;

ov is the overlap distance $d_o(b_1,b_2)$, where $d_o$ is the overlapping distance measure function;

tp is the block type. For example, 0 for a text block, 1 for an image block.

As will be appreciated, the tuple may include fewer or more than three attribute elements, such as one, two, four or more attribute elements. For two blocks $b_1$ and $b_2$, the tuple distance between them may be evaluated using the standard cosine function over their tuples $t_1$ and $t_2$. Other distance measures suitable for measuring the distance between vectors may be considered.

Any of these distance functions may be used in the exemplary embodiment for generating a distance measure for each block. The document index can be a concatenation or matrix comprising all the distance measures between each block in the document and each representative block.

Additionally, the set of document indexes is itself clustered using a clustering algorithm, and a "representative document index" is computed for each document index cluster (D-cluster). The representative document index is a mathematical representative of all the document indexes in the cluster. There is one representative document index per cluster of document indexes. As for the clustering of blocks, the number m' of document index clusters can be selected based on the number of documents in the collection, e.g., the square root of the number of documents.

The exemplary method of querying and ranking documents according to a document layout query may include the following steps.

First, a sample document to be matched or layout query Q is received, and the layout blocks extracted therefrom. The layout query is a set of data representing the blocks that a user (human or otherwise) wishes to find in a document collection. The layout blocks may be entered into a computer system in any suitable way. For example, a user may compose a layout query by drawing blocks on a suitable device, such as a touchscreen, or the user may draw layout blocks using a computer input device such as a mouse. Alternatively, the user may enter location information, such as the $x_i$, $y_i$ coordinates of two points of each block. In an alternative embodiment, the user may scan a document into memory and allow the system to extract the bounding blocks from the scanned document and use the extracted blocks as a layout query.

Next, the extracted layout blocks $b_1$, $b_2$, etc. from Q are projected onto the representative blocks created from the document collection in the indexing method, as described in further detail below. This results in a query document index that can be used to find document layouts similar to the query layout.

The query document index is then compared to each representative document index using a ranking function, as described below. The document index cluster with a representative document index that is determined to be most similar to the query index is selected. Then, all of the document indexes within the selected document index cluster are compared to the query index through the ranking function used above. As each comparison is made, an ordered list is maintained such that the top ranked document indexes (in order of similarity) may be returned as a product of the query.

Figure 4:
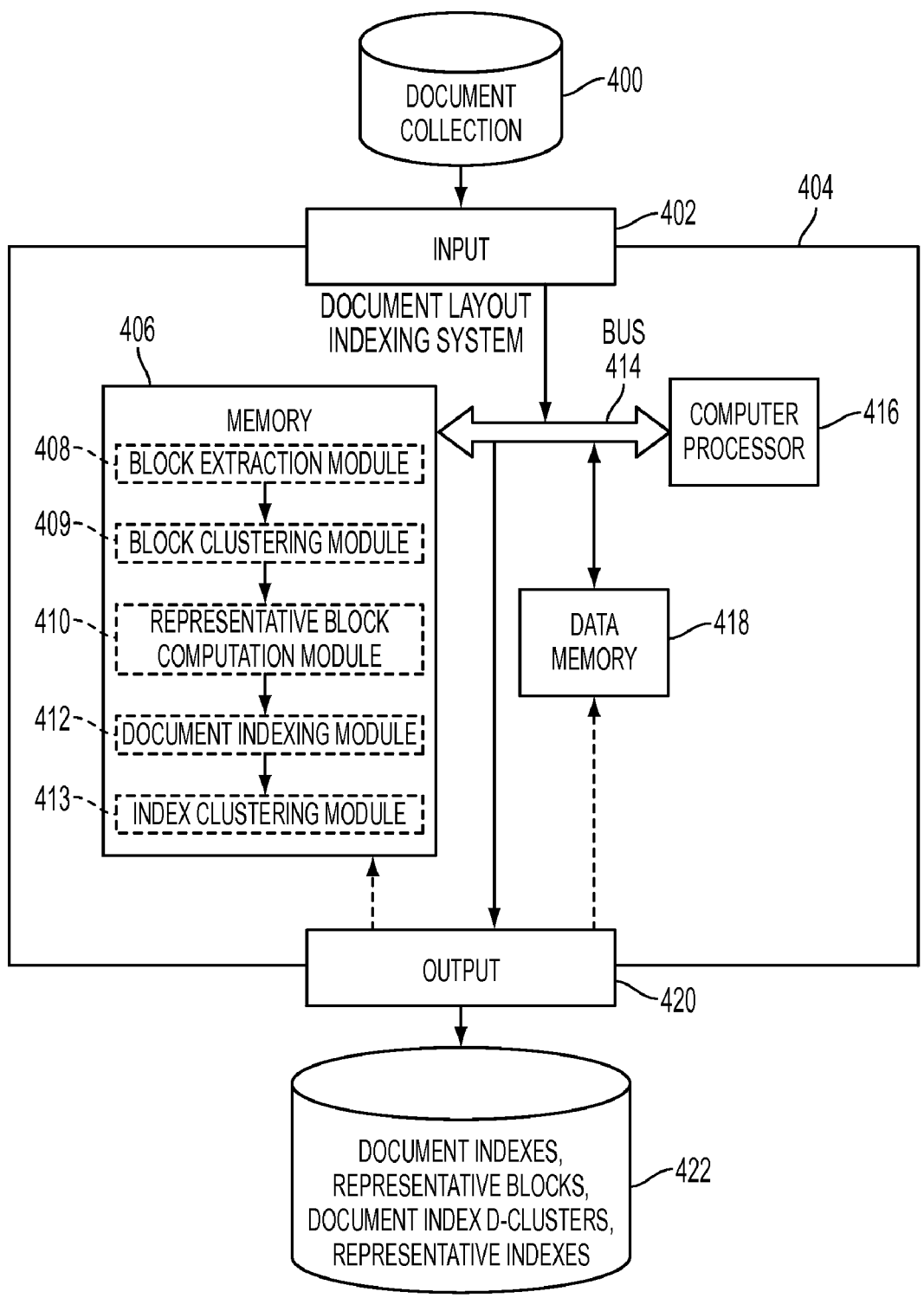
FIG. 4 is a functional block diagram for a document layout indexing system.

To illustrate aspects of the exemplary embodiment, FIG. 1 illustrates a sample document 100 that may be contained in a document collection 400 (FIG. 4). The sample document 100 is composed of a single page and may contain both text 110 and images 112 arranged in any manner. Multiple-page documents are split into multiple individual pages 100 for the purpose of the exemplary embodiment.

Figure 2:
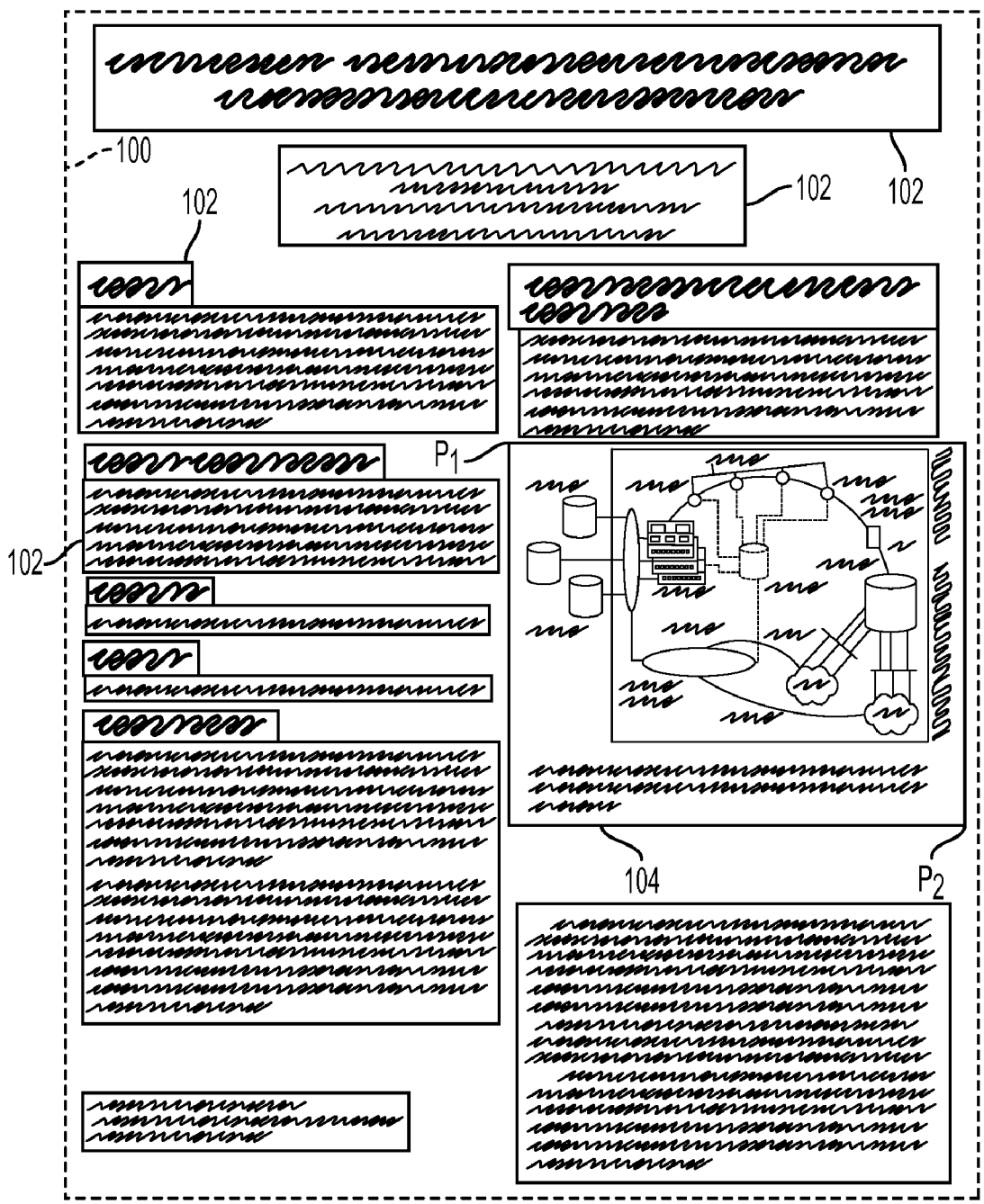
FIG. 2 illustrates the input document of FIG. 1, with text and image blocks outlined in a manner compatible with the exemplary embodiment.
Figure 3:
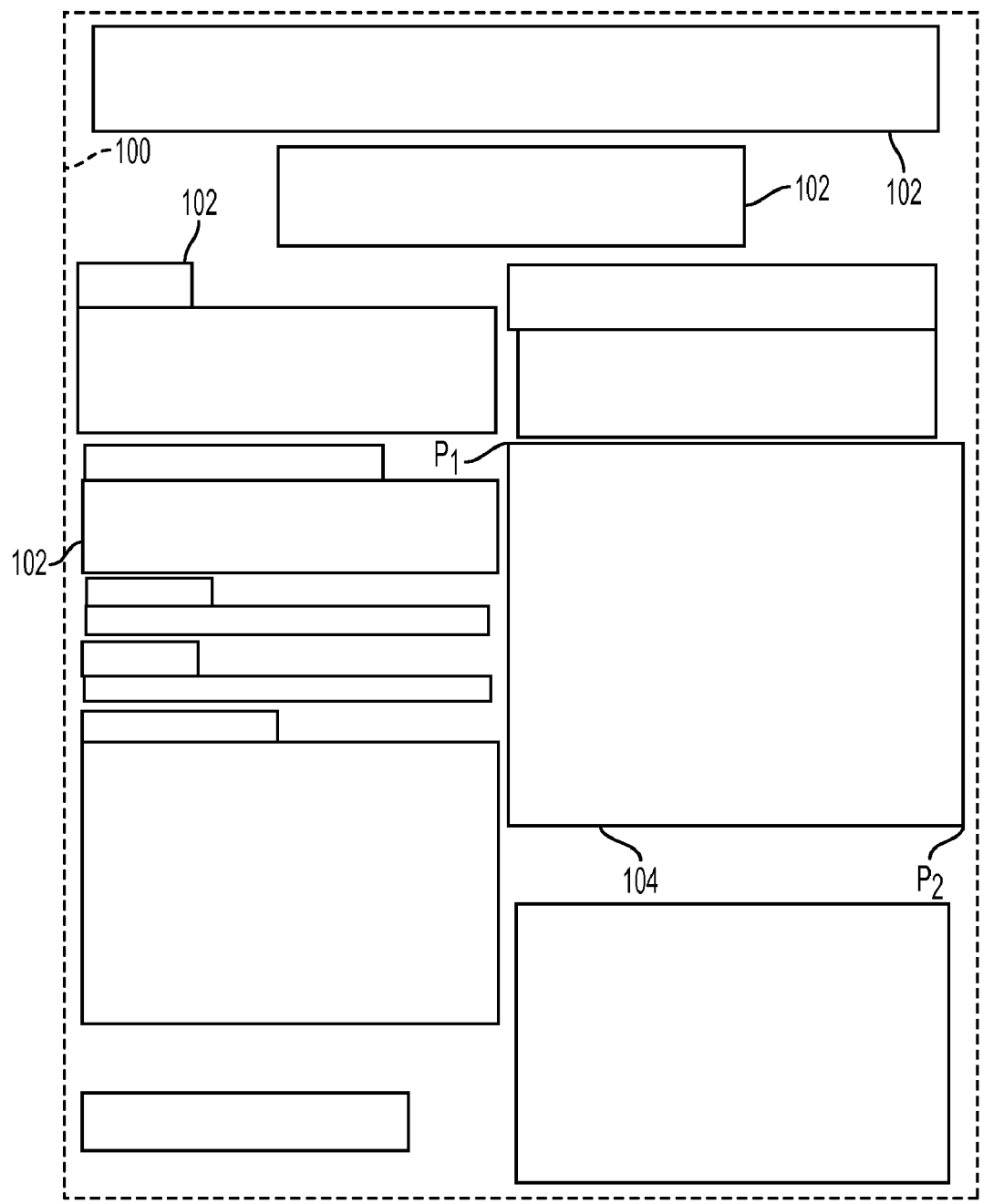
FIG. 3 illustrates the input document of FIG. 2, with the text and image content removed; the blocks are then input into an indexing algorithm.

FIGS. 2 and 3 illustrate the sample document 100 of FIG. 1 after the layout blocks 102, 104 have been computed. This computation can be performed by any device suitable for extracting bounding blocks from a document. For example, there are many software solutions that can perform such processing, such as PDF to XML standard converter software, as well as other PDF, Word, and Postscript software packages. Additionally, these software packages can be adjusted to compute the layout blocks 102 based on multiple parameters such as whitespace, box type (image vs. text), color, text size, etc. The exemplary layout blocks are always in the shape of a rectangle and may overlap over one another.

In mathematical terms, let S denote the collection of document layouts where each document layout D is given by a set of rectangular blocks, where each block contains either text or at least one image and is defined by one or more of its position, shape, size, block content (i.e., image or text), etc. Each document layout D is given by a set of blocks, $D=\{b_1, \ldots, b_n\}$, where each block $b_i$ is defined by two points $(p_1, p_2)$. In the exemplary embodiment, the two points denote the top left and bottom-right corners of block $b_i$ where $p_1 = (x_1, y_1)$ and $p_2 = (x_2, y_2)$, shown by way of example, on block 104. x and y are the horizontal and vertical coordinates of the document, respectively, and may be measured from a fixed point, such as the top left hand corner of the document.

FIG. 4 illustrates an exemplary system 404 for indexing layout blocks from documents contained in a document collection 400. The system 404 includes an input 402, for receiving the document collection 400. Prior to inputting, the document collection may be stored in any suitable tangible media such as a ROM or RAM drive or may be input into the system in the form of a carrier wave, e.g., via the Internet or other network. Alternatively, the document collection is provided within the computing device 404 itself or stored in a separate memory accessible to the system 404. The input may include a modem link, a wired or wireless connection, USB port, floppy or hard disk drive, or the like.

The system 404 includes data memory 418 for storing an input document collection 400 (or part thereof) being processed. Main memory 406 of the system stores a block extraction module 408, block clustering module 409, representative block computation module 410, document indexing module 412, and an index clustering module 413. The block extraction module 408 extracts the layout blocks 102, 104 from each document 100 in the document collection 400. The block extraction module 408 may be any module suitable to extract bounding blocks from a document. Alternatively, a custom block extraction module may be implemented. The block clustering module 409 clusters (i.e. "groups") the extracted blocks 102, 104 from the block extraction module 408 into a pre-defined number k of clusters. The representative block computation module 410 computes a representative block (FIGS. 9-10, item 904) for each cluster (FIGS. 9-10, item 900) created by the block clustering module 409. The document indexing module 412 creates a document index for each document 100 from the document collection 400 by comparing the blocks 102, 104 in the document with each representative block (FIGS. 9-10, item 904) created by the representative block computation module 410. The index clustering module 413 then clusters the document indexes computed by the document indexing module 412 for future use. The block extraction module 408, block clustering module 409, representative block computation module 410, document indexing module 412, and the index clustering module 413 may be implemented as hardware or software or a combination thereof. In the exemplary embodiment, these components 408, 409, 410, 412, 413 are in the form of software instructions stored in main memory 406, which are executed by a computer processor 416 in communication with memory 406. The processor 416, such as the computer's CPU, may control the overall operation of the computer system 404 by execution of processing instructions stored in memory 406. Components 406, 416, 418 of the computer system may be connected by a data control bus 414.

The exemplary system 404 includes an input/output device 420, which outputs a set of document indexes 422 created by the modules 408, 409, 410, 410, 412, 413 residing in memory 406. The set of document indexes 422 for the documents in the collection may be stored locally in RAM memory 406, 418, or stored in a storage device such as a hard disk, database, or other now known or future storage medium and may be linked in some way to the respective documents for which they have been generated.

As will be appreciated, the exemplary system 404 may comprise one or more computing devices, such as a personal computer, PDA, laptop computer, server computer, or combination thereof. Memories 406, 418 may be integral or separate and may represent any type of computer readable medium such as random access memory (RAM), read only memory (ROM), magnetic disk or tape, optical disk, flash memory, or holographic memory. In one embodiment, the memories 406, 418 comprise a combination of random access memory and read only memory. In some embodiments, the processor 416 and memory 406 and/or 418 may be combined in a single chip.

Figure 5:
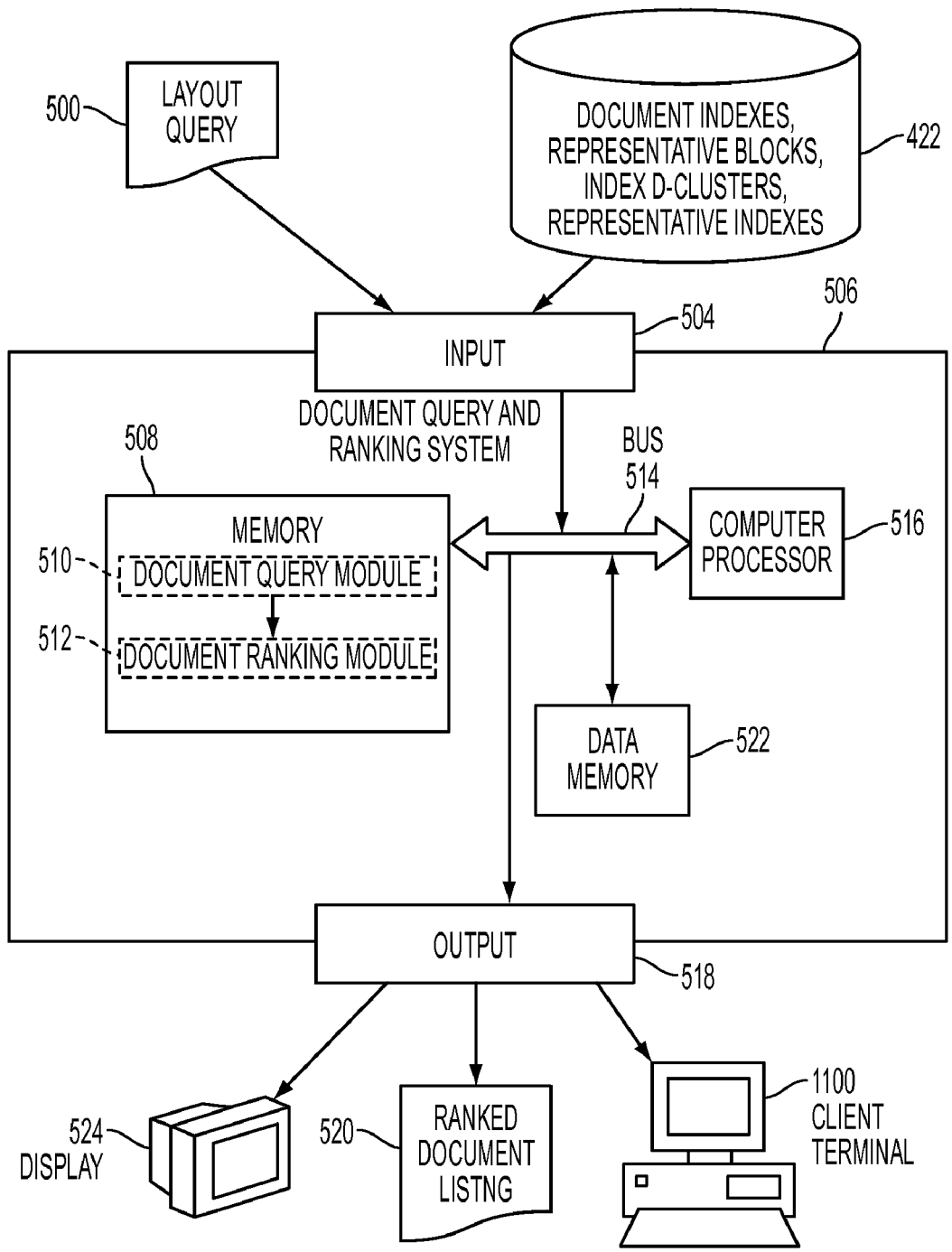
FIG. 5 is a functional block diagram of a system for a document query and ranking, which may be used in conjunction with the document layout indexing system of FIG. 4.

FIG. 5 illustrates an exemplary system 506 for querying and ranking documents based upon an input document layout D. The system 506 includes an input 504, for receiving both a layout query Q 500 and a set of document indexes, representative blocks, document index clusters (D-clusters), and representative document indexes 422. Prior to inputting the layout query 500, the set of document indexes, representative blocks, D-clusters, and representative indexes 422 of the document collection may be stored in any suitable tangible media such as a ROM or RAM drive or may be input into the system in the form of a carrier wave, e.g., via the Internet or a network. Alternatively, the layout query 500 and the set 422 of document indexes, representative blocks, index D-clusters, and representative indexes is generated within the computing device 506 itself (i.e. device 506 may include a document layout indexing system 404). The input 504 may include a modem link, a wired or wireless connection, USB port, floppy or hard disk receiver, or the like.

The system 506 includes data memory 522 for storing the input layout query 500 while it is being processed. The set of document indexes, representative blocks, D-clusters, and representative indexes 422 is also stored in computer memory, such as memory 522 or a separate memory. Main memory 508 of the system stores a document query module 510 and a document ranking module 512. The document query module 510 identifies one or more indexes from the set of document indexes 422 that are likely to represent documents similar to the input layout query 500. The document ranking module 512 ranks the indexes identified by the document query module 510 according to one or more ranking functions. The document query module 510 and the document ranking module 512 may be implemented as hardware or software or a combination thereof. In the exemplary embodiment, the document query module 510 and the document ranking module 512 include software instructions stored in main memory 508, which are executed by a computer processor 516 having access to memory 508. The processor 516, such as the computer's CPU, may control the overall operation of the computer system 506 by execution of processing instructions stored in memory 508. Components 508, 516, 518 of the computer system may be connected by a data control bus 514.

The exemplary system 506 of FIG. 5 includes an input/output device 518, which outputs a list of ranked documents 520 which the system 506 identifies as having a layout similar to the layout query 500. The exemplary output 518 is linked by a wired or wireless link to one or more of a display 524, such as a screen or monitor, memory storage where a ranked document listing 520 may be stored, or a client terminal 1100. The user inputting the query can view the retrieved documents on the display screen and determine whether they are responsive to the search query. If not, the user may choose to add attributes to the layout query.

As will be appreciated, the exemplary system 506 of FIG. 5 may comprise one or more computing devices, such as a personal computer, PDA, laptop computer, server computer, or combination thereof. Memories 508, 522 may be integral or separate and may represent any type of computer readable medium such as random access memory (RAM), read only memory (ROM), magnetic disk or tape, optical disk, flash memory, or holographic memory. In one embodiment, the memories 508, 522 comprise a combination of random access memory and read only memory. In some embodiments, the processor 516 and memory 508 and/or 522 may be combined in a single chip. In some embodiments, the exemplary systems 404, 506 embodied in FIGS. 4 and 5 may be combined into a single, unitary system.

Figure 6:
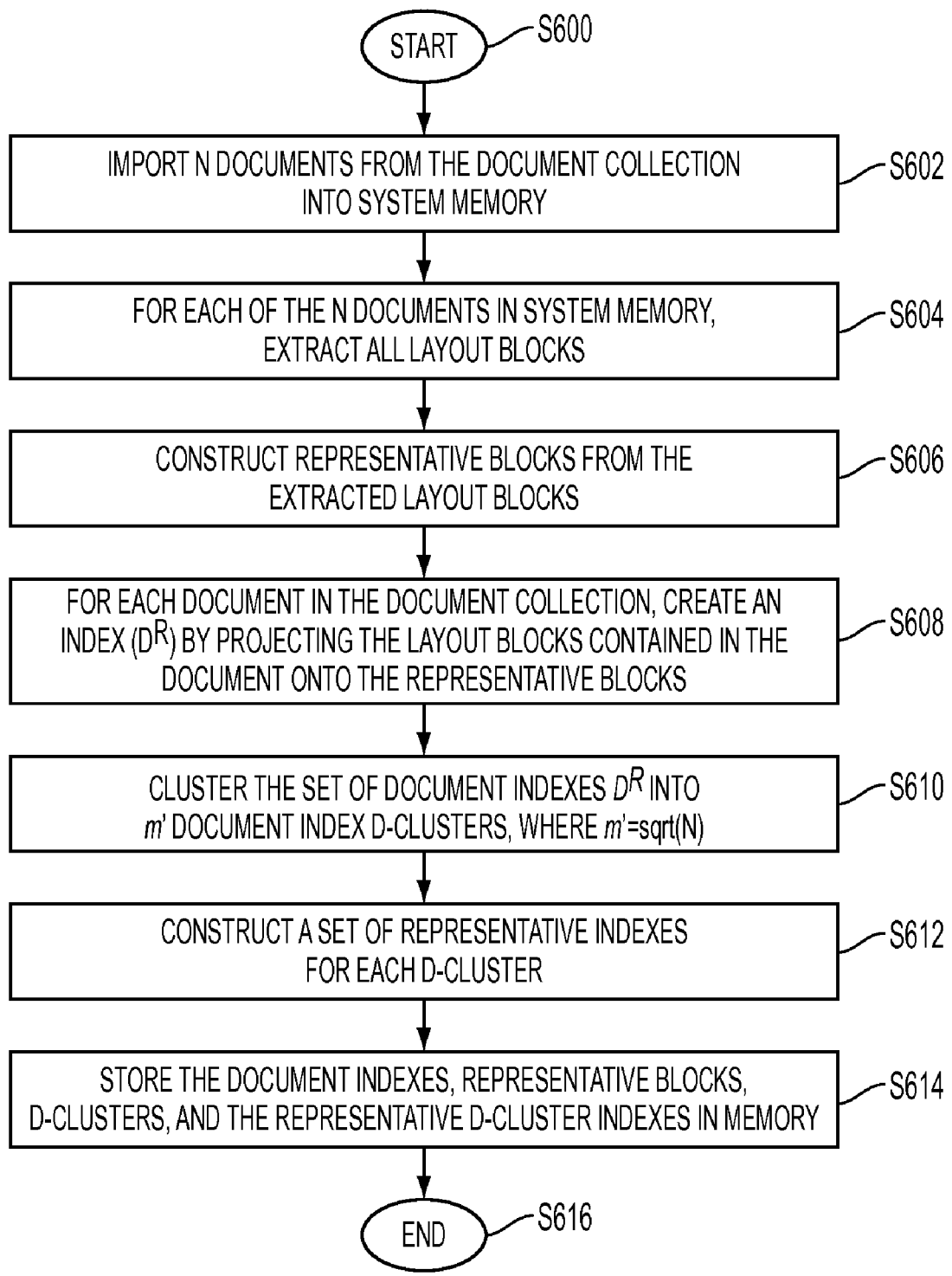
FIG. 6 is a flow diagram illustrating a method for indexing a collection of document layouts.

FIG. 6 illustrates a method for creating indexes for a plurality of documents in a document collection which can be performed with the system of FIG. 4. The method begins at S600.

At S602, a quantity of N documents 100 from a document collection 400 is provided to the input 402 (if they have not already been input into the system 404). The N documents 100 are imported into system memory 418 or data memory 406 for processing.

At S604, the block extraction module 408 extracts the layout blocks 102, 104, etc. from each document 100, and stores the aggregate block data (i.e., all the blocks from all the documents) in memory 406, 418.

At S606, the block clustering module 409, working in conjunction with the representative block computation module 410, clusters the aggregate block data stored in memory 406, 418 by the block extraction module 408, and constructs a representative block 904 for each cluster. The representative blocks 904 may represent the average of all the blocks in a given cluster 900.

At S608, for each document 100 in the document collection 400, a document index $D^R$ is created by projecting the layout blocks 102, 104 contained in the document 100 onto the representative blocks 904.

To illustrate S608, assume that a document layout D is given by a set of blocks 102, 104 where $D=\{b_i, i=\overline{1,n}\}$ where n is the number of blocks in the layout. For each block $b_i$, the similarity to representative blocks $B_j \in B^R$ (where $B_j$ is a representative block in the set of representative blocks $B^R$) is measured using a block distance function D, such as one of Eqn's (2) or (3) presented above. This produces a matrix $V(d)=\{v_{ij} | i=\overline{1,n}, j=\overline{1,m}\}$, where $v_{ij}=1-D(b_i, B_j)$, m is the number of block clusters (or representative blocks). There are two ways of projecting the matrix V(d) on the set $B^R$, as follows:

The first way employs a function which aggregates all "overlaps" of page blocks with a given representative block $B_j$, $$w_j = \sum_{i=1}^{n} v_{ij}. \qquad \text{Eqn (4)}$$

i.e., all of the distances contained in the V(d) matrix for a given cluster are added together to produce a single value.

The second function determines the closest block for each representative block $B^R$ and sets the index value as the distance between the selected page block and the representative block, $$w_j = \max_{i=1}^{n} v_{ij} \qquad \text{Eqn (5)}$$

Once the document index $\{w_j\}j=\overline{1,m}$ is computed (by the projection of the document's blocks $b_i$ on the set $B^R$), the document index can be optionally extended with more information. For example, information compatible with the commonly used "term frequency-inverse document frequency" (TF-IDF) model used for indexing text documents can be added. See http://en.wikipedia.org/wiki/Tf-idf for an explanation of the TF-IDF model. In the exemplary embodiment described here, $v_{ij}$ (computed above) is the weight of representative block $b_i \in D$ with respect to the Representative Block $B_j^r$, similar to the term frequency in the text documents.

Thus, additional weight can be given to the importance of $B_j^r$ in the document collection 400. If $bf_j$ denotes the Representative Block Frequency (BF), given by the number of blocks associated with the block, $bf_j = |C_j|$, then a block weight-inverted block frequency (BWIBF) model may be used to assign to block $b_i$ a weight $bwibf_{ij}$, in the layout D as:

$$bwbf_{ij} = v_{ij} \times \log \frac{N+1}{bf} \qquad \text{Eqn (6)}$$

where: N is the number of documents in the document collection 400;
i=1 to n;
j=1 to m;
n is the number of blocks in a cluster; and
m is the number of block clusters.

Further, the BWIBF index values are obtained by applying Eqn (4) or (5) to Eqn (6), producing Eqn (7):

$$w'_j = w_j \times \log \frac{N+1}{bf_j}. \qquad \text{Eqn (7)}$$

where $w'_j$ is the index value relative to cluster j after $w_j$ has been weighted with the BWIBF value.

At S610, the index clustering module 413 clusters the document indexes created in step S608 into m' document index clusters (D-clusters) where $m' = \sqrt{N}$. In the exemplary embodiment, module 413 performs the clustering with either the k-means or hierarchical clustering algorithms, although any clustering algorithm may be used.

At S612, a representative index is computed for each of the m' D-clusters created by the index clustering module 413. This index is created by calculating the centroid (e.g., average) of all the indexes in the D-cluster. For example, if a D-cluster contains two indexes Index1={2, 6, 10, 5} and Index2={6, 12, 8, 11}, then the representative index for the D-cluster would be {4, 9, 9, 8}.

At S614, the document indexes, representative blocks, D-clusters, and the representative D-cluster indexes are stored in a memory 406, 418, or output to a storage device 422.

The method ends at S616.

Figure 7:
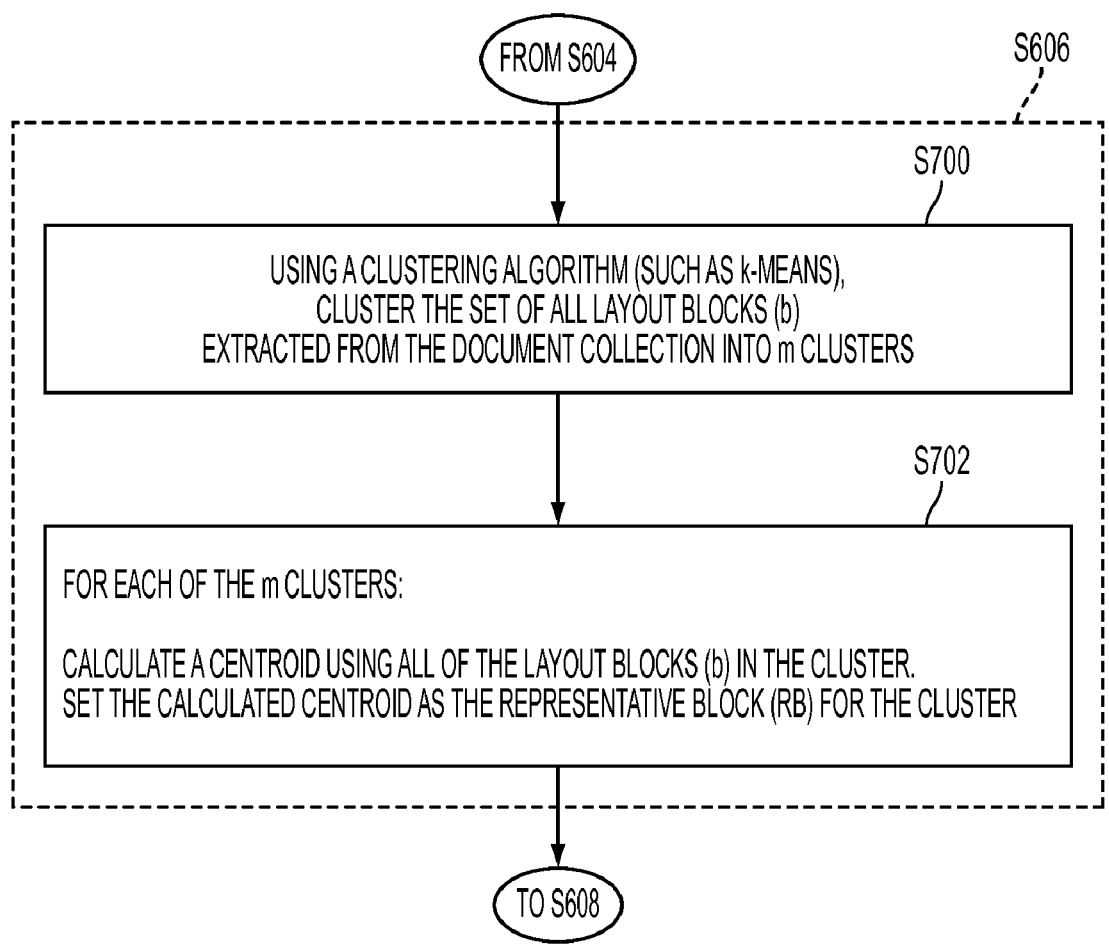
FIG. 7 is a detailed flow diagram illustrating the construction of representative blocks from a set of extracted layout blocks, which may be performed in the method of FIG. 6.

Specific aspects of S606 are illustrated in FIG. 7 and are described in greater detail below.

Before step S606 is performed, N documents 100 from the document collection 400 have been imported into system memory 406 or data memory 418, and all the layout blocks 102, 104 have been extracted from the N documents 100 in memory 406, 418. At step S700, the block clustering module 409 performs a clustering algorithm on all of the blocks contained in memory 406, 418. In mathematical terms, let B denote the set of all blocks 102, 104 in the layouts S of documents of collection 400, $B = \{b | b \in D, D \in S\}$. The clustering performed on B may be performed, for example, by a k-means algorithm with a predefined number of clusters m. The predefined number of clusters m is chosen based on factors such as the document collection size, number of blocks extracted, statistical variation within the blocks, etc. Once the clustering algorithm has converged to a stable solution, clusters $C_i, i = \overline{1,m}$ of blocks are produced.

Figure 9:
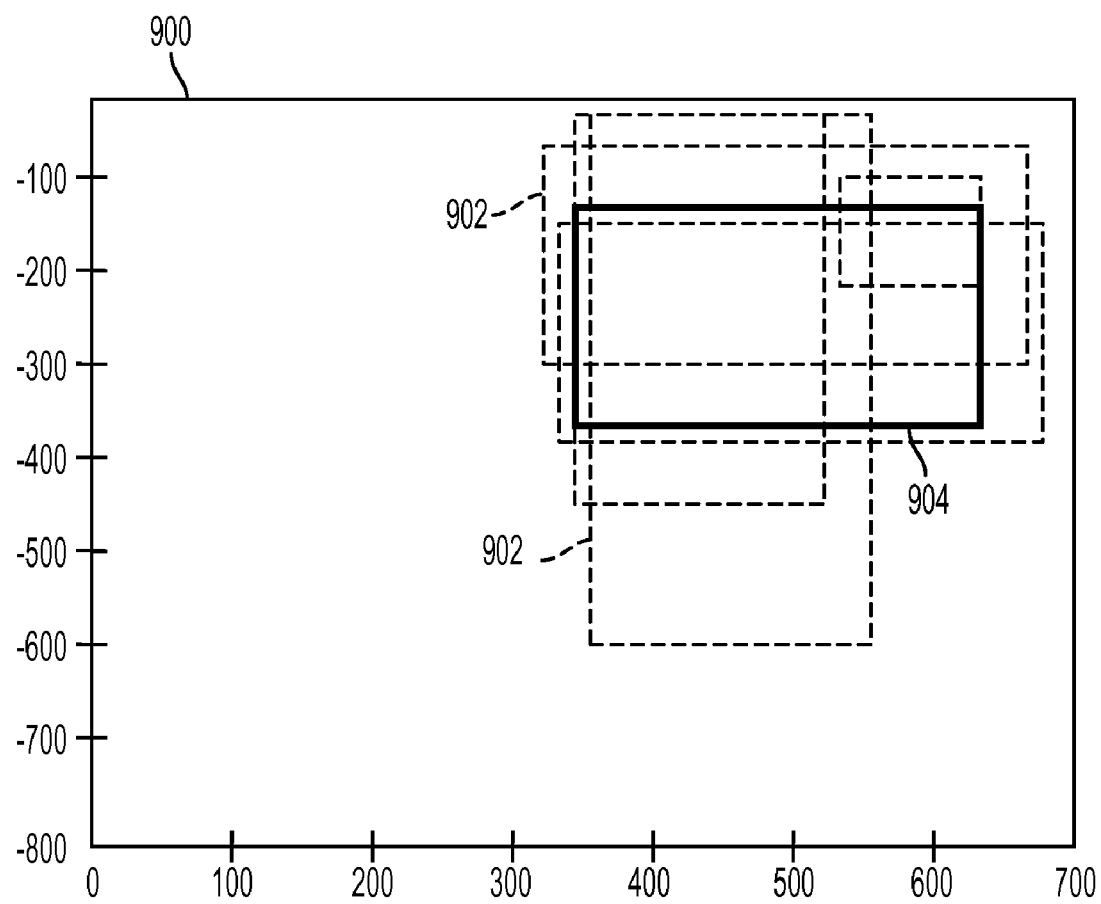
FIGS. 9 and 10 are graphical illustrations of block clusters and representative blocks generated by the document layout indexing system of FIG. 4.
Figure 10:
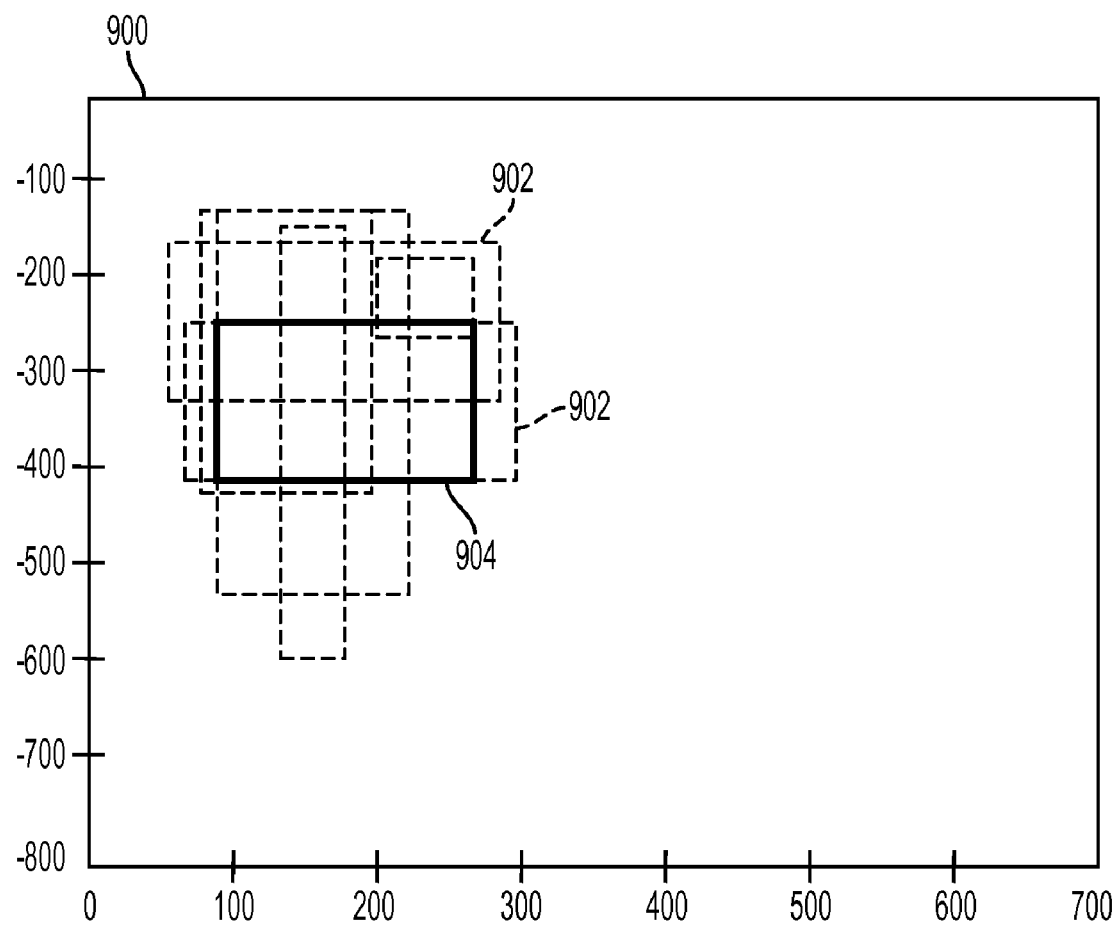

Because using all of the individual blocks in B for indexing different layouts is unpractical, as the majority of the blocks are unique and cannot be used directly for indexing, a set RB of representative blocks is constructed (one representative block per cluster). As illustrated in S702, for each cluster 900, $C_i = \{b_j\}$, a centroid 904 is computed using the equation $(p_1, p_2) = (\text{avg}(p_{i1}), \text{avg}(p_{i2})) | (p_{i1}, p_{i2}) = b_j \in C_i)$. The centroid 904 consists of two points ($p_1$ and $p_2$) which are essentially the averages of the corresponding points of each block b 902 in the cluster 904. After the centroid 904 is computed, it is set as the representative block $B_i^r$ for the cluster 900. FIGS. 9 and 10 show examples of clusters 900 of blocks 902 taken from a sample collection 400 and the corresponding centroids (i.e., representative blocks) 904.

Table 1 contains an exemplary algorithm summarizing the document indexing process of FIGS. 6 and 7.

TABLE 1

Document Layout Indexing

Figure 8:
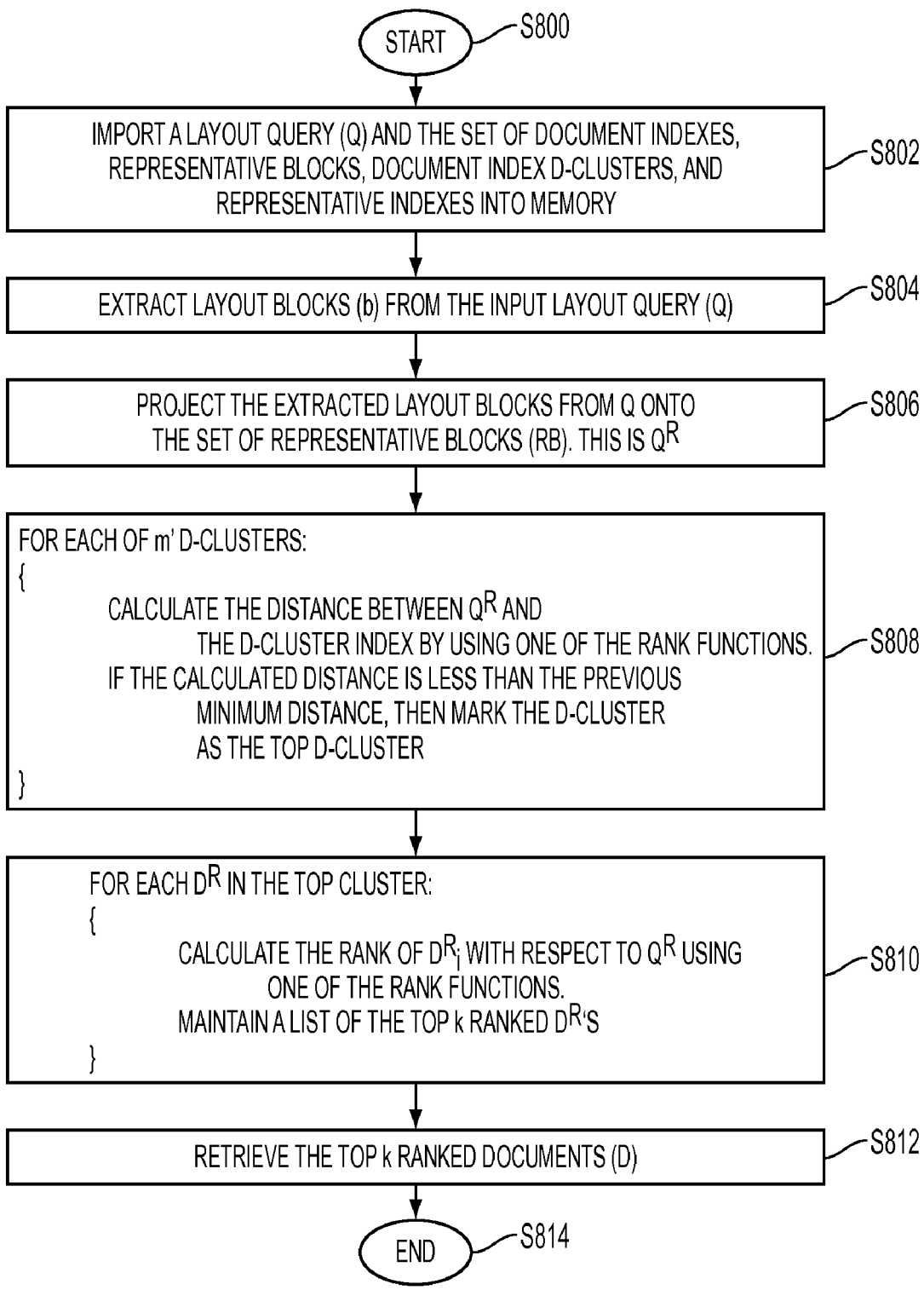
FIG. 8 is a flow diagram illustrating a method for querying and ranking documents based upon a given document layout.

Require: S, a set of N block-wise document layouts
Require: m, the number of representative blocks
Ensure: Representative block set $B^R$ and indexes for all $D \in DB$
1: Create the block set $BS = \{b | b \in D, D \in DB\}$
2: Run a clustering method on BS with m clusters
3: for each cluster Ci, $i = \overline{1,m}$ do
4:    Build the cluster centroid and assign it as the cluster representative, $B_i^r$.
5: end for
6: Let $B^R$ be the set of representative blocks, $B^R = \{B_i^r, i = \overline{1,m}\}$
7: for each document $D \in DB$ do
8:    Build index $D_R$ as the projection of D on $B^R$ using (4)/(5) and (6)
9: end for
10: Cluster the set of indexes $D_R$ in m' D-clusters, where $m' = \sqrt{N}$ FIG. 8 illustrates the process of processing an input query layout and producing the top k matching document indexes or corresponding documents. The illustrated method may be performed with the system described in FIG. 5. The method begins at S800.

At S802, a layout query 500 and a set of document indexes, representative blocks, index D-clusters, and representative indexes 422 is provided to the input 504 (if they have not already been input into the system 506). The inputs 500, 422 are imported into system memory 508 or data memory 522 for processing.

At S804, the the document query module 510 extracts the layout blocks 102, 104 from the layout query 500. As described above in connection with FIGS. 2 and 3, this step may be performed by any device suitable to extract bounding blocks from a document. For example, there are many software solutions that can perform such processing, such as PDF to XML standard converter software, as well as other PDF, Word, and Postscript software packages. Additionally, these software packages can be adjusted to compute the layout blocks 102, 104 based on multiple parameters such as whitespace, box type (image vs. text), color, text size, etc. The layout blocks are always in the shape of a rectangle and may overlap over one another.

At S806, the document query module 510 computes an index $Q^R$ for the query layout by projecting the extracted layout blocks 102, 104 contained in the layout query 500 onto the set of representative blocks 904 input into memory. The projection algorithm is the same as described above with respect to the document collection indexes of S608. Once the query index $Q^R$ is obtained, it can be compared to an index $D^R$ to determine the similarity between the layout query 500 and a document 100 represented by $D^R$. In mathematical terms, the similarity between a query Q and a document D is approximated by their projections on the representative block set $B^R$, $B^R$,rank(Q,D)$\approx$($Q^R$,$D^R$), where the query and document indexes are vectors $Q^R=\{q_i^r, i=\overline{1,m}\}$ and $D^R=\{d_i^q, i=\overline{1,m}\}$. The rank(Q,D) function can be defined as simply the standard cosine function:

$$rank_1(Q, D) = cosine(Q^R, D^R) = \frac{Q^R \cdot D^R}{\|Q^R\|\|D^R\|} \quad \text{Eqn (8)}$$

The cosine function ranks all documents by giving them values between 1 (the best match) and 0. In some cases, by approximating the distance between a document D and a query Q by using equation (8) above, some irregularities may occur as illustrated by the following example. Assume for simplicity k=2 and a query index $Q^R=\{0.86, 0.0\}$. With such a sparse query index, two documents $D_1^R=\{0.96, 0.0\}$ and $D_2^R=\{0.46, 0.0\}$ yield the same cosine value 1 while $D_1^R$ should clearly be better ranked than $D_2^R$. The problem comes from the fact that in k-dimensional space, an angle between two index vectors captures their similarity only partially. Sparse indexes are particularly susceptible to this problem.

In one embodiment, the sparse index problem is addressed by correcting the cosine-based ranking function and integrating the index absolute values. The following function factorizes the cosine by the difference between the query and document vectors:

$$rank_2(Q, D) = cosine(Q^R, D^R) \times \left(1 - \frac{1}{\sqrt{m}}\|Q^R - D^R\|\right). \quad \text{Eqn (9)}$$

The function $rank_2$ yields 1 for the exact match. However, it is observed that for the same query index, two documents $D_1^R=\{0.96, 0.0\}$ and $D_2^R=\{0.76, 0.0\}$ still assign the same rank. Thus, the $rank_2$ function can be corrected further as follows:

$$rank_3(Q, D) = cosine(Q^R, D^R) \times \left(1 - \sqrt{\frac{1}{m}\sum_{i=1}^{m} diff^2(q_i^r, d_i^r)}\right), \quad \text{Eqn (10)}$$

where the element-based difference is biased toward higher values, $$diff(q^r, d^r) = \begin{cases} q^r - d^r & \text{if } q^r < d^r \\ (q^r - d^r)^2 & \text{otherwise} \end{cases} \quad \text{Eqn (11)}$$

Note that the last rank function in Eqns. (10)-(11) is asymmetric, unlike the first two functions in Eqns. (8) and (9).

Thus, any of the ranking functions of Eqns. (8), (9), and (10) can be used to compare the similarity of layout indexes, but the ranking function (10) may produce better results.

At S808, the document query module 510 computes the distance (similarity) between the layout query index $Q^R$ and each of the D-cluster representative indexes input in S802 (computed previously by S612) using one of the rank functions (8), (9), and (10) above. The document query module 510 also keeps track of the most similar D-cluster representative index and designates the corresponding D-cluster as the "top D-cluster." The top D-cluster contains a cluster of indexes $D^R$ that have been determined to be the most similar to the layout query index $Q^R$.

At S810, control is passed to the document ranking module 512 which computes the rank of each $D^R$ in the top D-cluster relative to the layout query $Q^R$. Concurrently, the document ranking module 512 maintains an ordered list of the document indexes $D^R$ according to the computed rank.

At S812, the document ranking module 512 outputs, through an input/output device 518, responsive documents, such as a list of the top k documents 520 according to the ordered list constructed in S810 to one or more of a display 524, client terminal 1100, or other human readable interface. Alternatively, the document ranking module may output the top k documents 100, rather than a list of the top k documents 520.

The method ends at S814.

Table 2 contains an algorithm summarizing the document indexing process of FIG. 8.

TABLE 2

Querying and relevance ranking

Require: D-clusters of document indexes $D^R, D \in S$, representative blocks $B^R$
Require: Query document Q
Ensure: k top relevant documents for Q with ranking
  1: Extract layout blocks from the query document
  2: Get the projection $Q^R$ of the query layout on $B^R$
  3: for For each D-cluster do
  4:    Evaluate the distance between $Q_R$ and D-cluster using one of rank functions
  5:    Keep it as $D_{top}$ if yielding the minimal distance
  6: end for
  7: for For each document index in cluster $D_{top}$ do
  8:    Evaluate the rank $D_i^R$ w.r.t. $Q^R$ using one of rank functions
  9:    Keep it if yielding the k top ranks
10: end for
11: Retrieve k documents with the top ranks The methods illustrated in FIGS. 6-8 may be implemented in a computer program product or products that may be executed on a computer. The computer program product may be a tangible computer-readable recording medium on which a control program is recorded, such as a disk or hard drive. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other medium from which a computer can read and use. Alternatively, a transmittable carrier wave may be provided in which the control program is embodied as a data signal, e.g., transmission media, such as acoustic or light waves, such as those generated during radio wave and infrared data communications, and the like.

The exemplary methods may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowcharts shown in FIGS. 6-8 can be used to implement the exemplary methods described herein.

While in the exemplary embodiment, the methods disclosed herein include execution of at least one of the steps by a processor of a computer, it is will be appreciated that one or more steps of the methods may be manually performed.

FIGS. 9 and 10 each illustrate a cluster 900 of layout blocks 902, with a representative block 904 computed as the average (here, the mean) of all the blocks 902 in the cluster 900.

Figure 11:
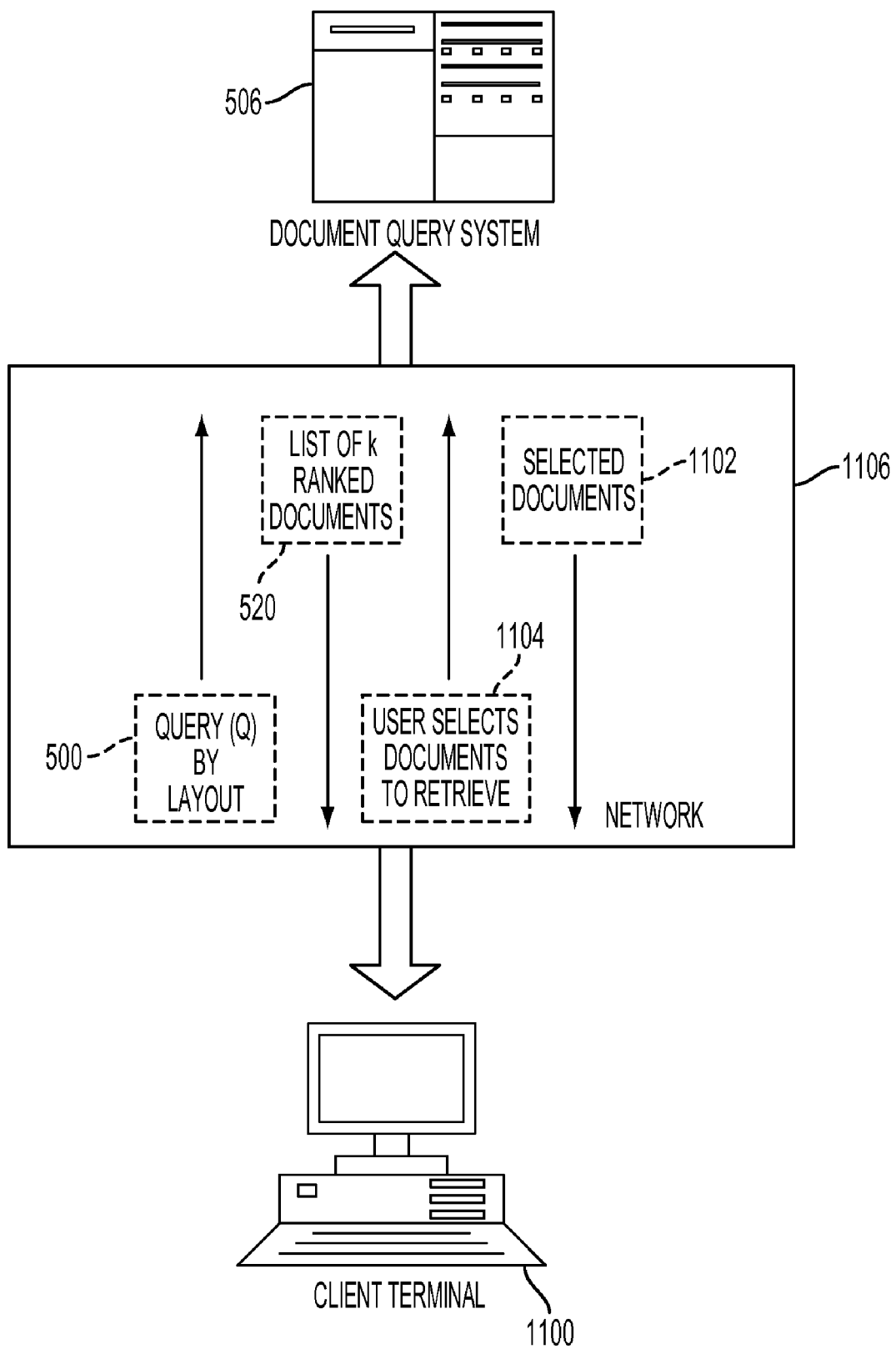
FIG. 11 is a functional block block diagram for the communication between a client terminal and a document query system.

FIG. 11 illustrates an exemplary system for querying a document query system by document layout. The system includes a document query system 506, a client terminal 1100, a network connection 1106, and network messages 500, 520, 1104, 1102. The document query system 506 is connected to at least one client terminal 1100 through a network connection 1106. The network connection 1106 may be wired or wireless, infrastructure or ad hoc, or a direct connection between the client terminal 1100 and the document query system 506 through a shared bus. The document query system 506 may further include a document layout indexing system 404. In the exemplary embodiment, a user at the client terminal 1100 will send a layout query 500 to the document query system 506 over the network 1106. The document query system 506 then processes the layout query 500 and returns a list of k ranked documents 520 that most closely match the layout query 500. The client terminal 1100 then sends a network message 1104 to the document query system 506 indicating the documents 100 that the user would like to retrieve (or view). The document query system then retrieves the requested documents 1104 and sends them over the network 1106 to the client terminal 1100 for use by the user. The client terminal may include a display screen for displaying the retrieved documents and/or their layouts and for generating a query.

Without intending to limit the scope of the exemplary embodiment, the following Example demonstrates an implementation of the method.

Example

A prototype system which implements querying by layout is constructed such that the system is capable of being tested locally. The system allows a person to select a query document from a collection, and to retrieve and rank the top k relevant documents. Additionally, it allows querying by navigating through the pages of multi-page documents and visualizing either the document image or the layout only. For the prototype system, the indexes have been created for several collections, including a generic collection of a company's documents and a publicly available collection of documents (CPO) assembled by Vikef (Virtual Information and Knowledge Environment Framework). For a given query, the document querying and ranking system 506 applies the algorithm of Table 2. The prototype system is set to report k=15 top relevant documents.

For the preliminary evaluation, the tuple block distance function of Eqn (3) and the maximum projection function of Eqn (5) are used. Ten random query documents from each collection are gathered and manually matched with the top 10 relevant documents per query. The top 10 relevant documents per query are manually annotated with a ranking of 1 to 10. Because the top 10 relevant documents for each query have been manually computed, it is possible to measure the rank error of the algorithm by comparing the algorithm's results with the results of the manual ranking. For each query Q, one of the ranking functions (8), (9), or (10) is applied to the layout query and the rank error is measured as $\Sigma_i |\text{ref}(D_i) - \text{rank}(D_i)|$, where ref(D) and rank(D) are the position of document D in the reference ranking and function ranking, respectively. When the function ranking matches the reference (i.e., manually computed) ranking, the ranking error is 0.

Table 3 reports the evaluation results for both collections. The total rank error is evaluated for the three ranking measures given in Eqns. (8), (9) and (10). As the table shows, using the third ranking function reduces the ranking error by about 27% and 32% for the generic document and CPO collections, respectively.

TABLE 3

| Evaluation of ranking functions | | |
|---|---|---|
| Ranking function | GENERIC | CPO |
| rank$_1$ in (8) | 436 | 751 |
| rank$_2$ in (9) | 382 | 659 |
| rank$_3$ in (10) | 318 | 513 |

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A computer-implemented method for creating a set of indexes for a collection of documents according to document layout, comprising:
    providing a plurality of documents to computer memory;
    extracting layout blocks from the provided documents;
    using a computer processor, clustering the layout blocks into a plurality of layout block clusters;
    computing a representative block for each of the layout block clusters;
    generating a document index for each provided document based on the layout blocks of the document and the computed representative blocks;
    clustering the created document indexes into a plurality of document index clusters;
    generating a representative cluster index for each of the document index clusters; and
    outputting the generated document indexes, representative blocks, document index clusters, and representative cluster indexes to memory.

2. The method of claim 1, wherein the clustering of the generated document indexes into document index clusters comprises:
    clustering the generated document indexes into m' document index clusters,
    where m'=$\sqrt{N}$ and N is the number of documents provided to computer memory.

3. The method of claim 1, wherein at least one of the clustering of the generated document indexes into document index clusters and the clustering of the layout blocks into layout block clusters comprises using one of the following algorithms:
- a k-means clustering algorithm, and
- a hierarchical clustering algorithm.

4. The method of claim 1, wherein each representative document index is computed by using an averaging function on all the document indexes in the document index cluster for which the representative document index is computed.

5. The method of claim 1, wherein the extracting of layout blocks from the provided documents comprises extracting location information which defines a size and a location of each layout block on a document page.

6. The method of claim 1, wherein each layout block is rectangular and has a height and width of a minimum size to bound a block of text or an image in the document.

7. The method of claim 1, wherein the computing of the representative block for each of the layout block clusters comprises computing a first point and a second point which together define a location and a shape of the representative block, the representative block's first point being computed as a function of a first point of each layout block in the cluster, the representative block's second point being computed as a function of a second point of each layout block in the cluster, the first point and the second point of each layout block together defining a location and shape of the layout block.

8. The method of claim 1, wherein the generating of a document index comprises:
- computing a similarity between each layout block in the provided document and each representative block; and
- generating a document index for each provided document based on the computed similarities.

9. The method of claim 8, wherein the generating of the document index based on the computed similarities comprises using one of the following functions:

$$w_j = \sum_{i=1}^{n} v_{ij}, \text{ and}$$

$$w_j = \max_{i=1}^{n} v_{ij}$$

where n is the number of layout blocks in the document,
m is the number of representative blocks,
i=1 to n,
j=1 to m,
$v_{ij}$ is a vector of values, with each value representing the computed similarity between a layout block and a representative block, and
the document index is a vector comprising m elements, with each element equal to $w_j$ for j=1 to m.

10. The method of claim 9, further comprising:
weighting the values in the document index as a function of the relative number of blocks associated with each representative block.

11. The method of claim 8, wherein the computing of the similarity between a layout block in a provided document and a representative block comprises computing a distance measure between the layout block and the representative block.

12. The method of claim 11, wherein the computing of the distance measure comprises computing a function of the Manhattan distances between:
a) a first point defining the layout block and a corresponding first point defining the representative block; and
b) a second point defining the layout block and a corresponding second point defining the representative block.

13. The method of claim 8, wherein the computing of the similarity between each layout block in a provided document and each representative block comprises determining an extent of overlap between the layout block and the representative block.

14. The method of claim 8, wherein the computing of the similarity between each layout block in a provided document and each representative block comprises:
generating a tuple for each layout block and a tuple for each representative block, each of the tuples comprising location information for the respective block and at least one attribute value for the respective block; and
computing a distance measure between the layout block tuple and the representative block tuple.

15. The method of claim 14, wherein the attribute value is selected from a first attribute value based on a shape ratio of the layout block, a second attribute value based on an overlap distance between the layout block and the representative block, a third attribute based on a block type, and combinations thereof.

16. The method of claim 1, further comprising input document layout query, extracting layout blocks from the input layout query and retrieving responsive documents from the collection using the generated document indexes, representative blocks, document index clusters, and representative cluster indexes.

17. A computer-implemented method for querying a collection of documents according to document layout, comprising:
providing in computer memory:
a set of representative blocks, each representative block being representative of a respective cluster of layout blocks extracted from documents in the collection,
a set of document indexes, each document index being representative of layout blocks of a respective document in the collection, each of the document indexes being assigned to a respective one of a set of document index clusters, and
a representative document index for each document index cluster, each representative document index being derived from the document indexes assigned to the document index cluster;
extracting layout blocks from an input document layout query;
projecting the extracted layout blocks from the document layout query onto the set of representative blocks to generate a query document index;
with a computer processor, computing a measure of similarity between the query document index and each of the representative document indexes in the set of representative document indexes;
identifying a top document index cluster which includes the representative document index determined to have the greatest similarity to the query document index;
computing a measure of similarity between each document index in the top document index cluster and the query index to identify a set of most similar documents; and
outputting information on the documents in the set of most similar documents.

18. The method of claim 17, wherein the query index comprises a vector and further including at least one of a) and b):
a) each of the representative document indexes comprises a vector and wherein the computation of the similarity measure between the query index and each of the representative document indexes comprises assigning a first rank based on a cosine of the angle between the query vector and the representative document index vector; and b) each of the document indexes comprises a vector and wherein the computation of the similarity measure between the query index and each of the document indexes comprises assigning a second rank based on a cosine of the angle between the query vector and the document index vector.

19. The method of claim 18, wherein at least one of:

the first rank is a function of the cosine of the query vector and the representative document index vector and also of the number of the representative blocks; and the second rank is a function of the cosine of the query vector and the document index vector and also of the number of the representative blocks.

20. The method of claim 18, wherein at least one of the first and second ranks is defined by one of $rank_1(Q,D)$, $rank_2(Q,D)$ and $rank_3(Q,D)$, as follows:

$$rank_1(Q, D) = \operatorname{cosine}(Q^R, D^R) = \frac{Q^R \cdot D^R}{\|Q^R\| \|D^R\|}$$

$$rank_2(Q, D) = \operatorname{cosine}(Q^R, D^R) \times \left(1 - \frac{1}{\sqrt{m}} \|Q^R - D^R\|\right); \text{ and}$$

$$rank_3(Q, D) = \operatorname{cosine}(Q^R, D^R) \times \left(1 - \sqrt{\frac{1}{m}\sum_{i=1}^{m} \mathit{diff}^2(q_i^r, d_i^r)}\right),$$

where $\mathit{diff}(q^r, d^r) = \begin{cases} q^r - d^r & \text{if } q^r < d^r \\ (q^r - d^r)^2 & \text{otherwise,} \end{cases}$ $Q^R$ is a vector equivalent to the query index, and optionally, $Q^R = \{q_i^r, i=\overline{1,m}\}$, $D^R$ is a vector equivalent to either a representative document index or a document index depending on the whether the first or second rank is computed, and optionally, $D^R = \{d_i^q, i=\overline{1,m}\}$, and m is the number of representative blocks.

21. A computer-based system for performing the method of claim 1, comprising:

(i) a block extraction module configured to extract layout blocks from the provided documents;

(ii) a block clustering module configured to cluster the layout blocks into layout block clusters;

(iii) a representative block computation module configured to compute a representative block for each of the layout block clusters;

(iv) a document indexing module configured to generate an index for each provided document with respect to the layout blocks of the document and the computed representative blocks; and (v) an index clustering module configured to:

cluster the created indexes into document index clusters; and generate a representative document index for each of the document index clusters.

22. A computer-based system for querying a collection of documents according to a document layout, comprising:

(i) a data input module configured to receive into memory:

a set of document indexes, a set of representative blocks, a set of document index clusters, a set of representative indexes, and a document layout query;

(ii) a document query module configured to:

extract layout blocks from the document layout query, project the extracted layout blocks from the document layout query onto the set of representative blocks to generate a query index, compute the similarity between the query index and each of the representative indexes in the set of document index clusters by using a ranking function, identify the document index cluster containing the representative index having the greatest similarity as the top document index cluster, and compute the similarity between each document index in the top document index cluster and the query index by using the ranking function; and (iii) a document ranking module configured to:

maintain an ordered list of the top k documents based on the computed similarity between each document index in the top document index cluster and the query index, and output the ordered list.

23. The system of claim 22, wherein the system outputs the ordered list to an associated client terminal.

24. The system of claim 23, wherein when the client terminal identifies to the system at least one document to retrieve from the ordered list, the system provides the at least one document to the client terminal.

25. The system of claim 23, further comprising a touchscreen, and wherein the document layout query is generated through the use of the touchscreen.

* * * * *